United States Patent [19]
Oglesby et al.

[11] Patent Number: 5,799,648
[45] Date of Patent: Sep. 1, 1998

[54] GAS POWERED HEATING DEVICE

[75] Inventors: Alfred P. Oglesby; John P. Oglesby, both of Carlow, Ireland

[73] Assignee: Oglesby & Butler Research and Development Limited, Carlow, Ireland

[21] Appl. No.: 619,686

[22] PCT Filed: Oct. 3, 1994

[86] PCT No.: PCT/IE94/00047

§ 371 Date: Apr. 1, 1996

§ 102(e) Date: Apr. 1, 1996

[87] PCT Pub. No.: WO95/09712

PCT Pub. Date: Apr. 13, 1995

[30] Foreign Application Priority Data

Oct. 1, 1993 [GB] United Kingdom ............... S930733

[51] Int. Cl.⁶ ........................................... B23K 3/02
[52] U.S. Cl. ................. 126/414; 126/413; 126/401; 126/403; 222/146.2
[58] Field of Search .................... 431/77, 82, 75; 236/88, 89; 126/406, 403, 409, 414, 413, 401; 222/113, 146.2; 401/1, 2

[56] References Cited

U.S. PATENT DOCUMENTS

| | | |
|---|---|---|
| 2,601,579 | 6/1952 | Wittman . |
| 2,678,774 | 5/1954 | Arvin . |
| 4,374,528 | 2/1983 | Tittert ........................... 125/409 |
| 5,178,530 | 1/1993 | Roldan et al. ................. 126/409 |

FOREIGN PATENT DOCUMENTS

| | | |
|---|---|---|
| 135628 | 1/1947 | Australia ........................ 236/88 |
| 0118282 | 9/1984 | European Pat. Off. . |
| 0274836 | 7/1988 | European Pat. Off. . |
| 3543562 | 6/1987 | Germany . |
| 55-140033 | 11/1980 | Japan ............................ 431/77 |
| 57-131922 | 8/1982 | Japan . |
| 9004735 | 5/1990 | WIPO . |

*Primary Examiner*—Carl D. Price
*Attorney, Agent, or Firm*—Sughrue, Mion, Zinn, Macpeak & Seas, PLLC

[57] ABSTRACT

A gas powered soldering tool (1) comprising a main body member (4) terminating in a soldering tip portion (8) has a combustion chamber (10) located therein. A gas catalytic combustion element (12) is located in the combustion chamber (10), and fuel gas is delivered into the combustion chamber (10) from a jet nozzle (15) and an air mixing venturi bore (17). A temperature responsive controller (28) for controlling the fuel gas supply to the jet nozzle (15) comprises a valve (39) having a valving member (58) which is operable by a permanent magnet (63) slidably located in a bore (64). A first member (70) of thermomagnetic material the Curie point of which is substantially similar to the temperature at which the main body member (4) is to be controlled is located at one end of the bore (64). The magnetic attraction between the first member (70) and the permanent magnet (63) is greater than the magnetic attraction between a second member (71) in the bore (64) and the permanent magnet (63) when the first member (70) is magnetic, thereby maintaining the valve (39) open, and vice versa when the first member (70) becomes non-magnetic for closing the valve (39).

27 Claims, 4 Drawing Sheets

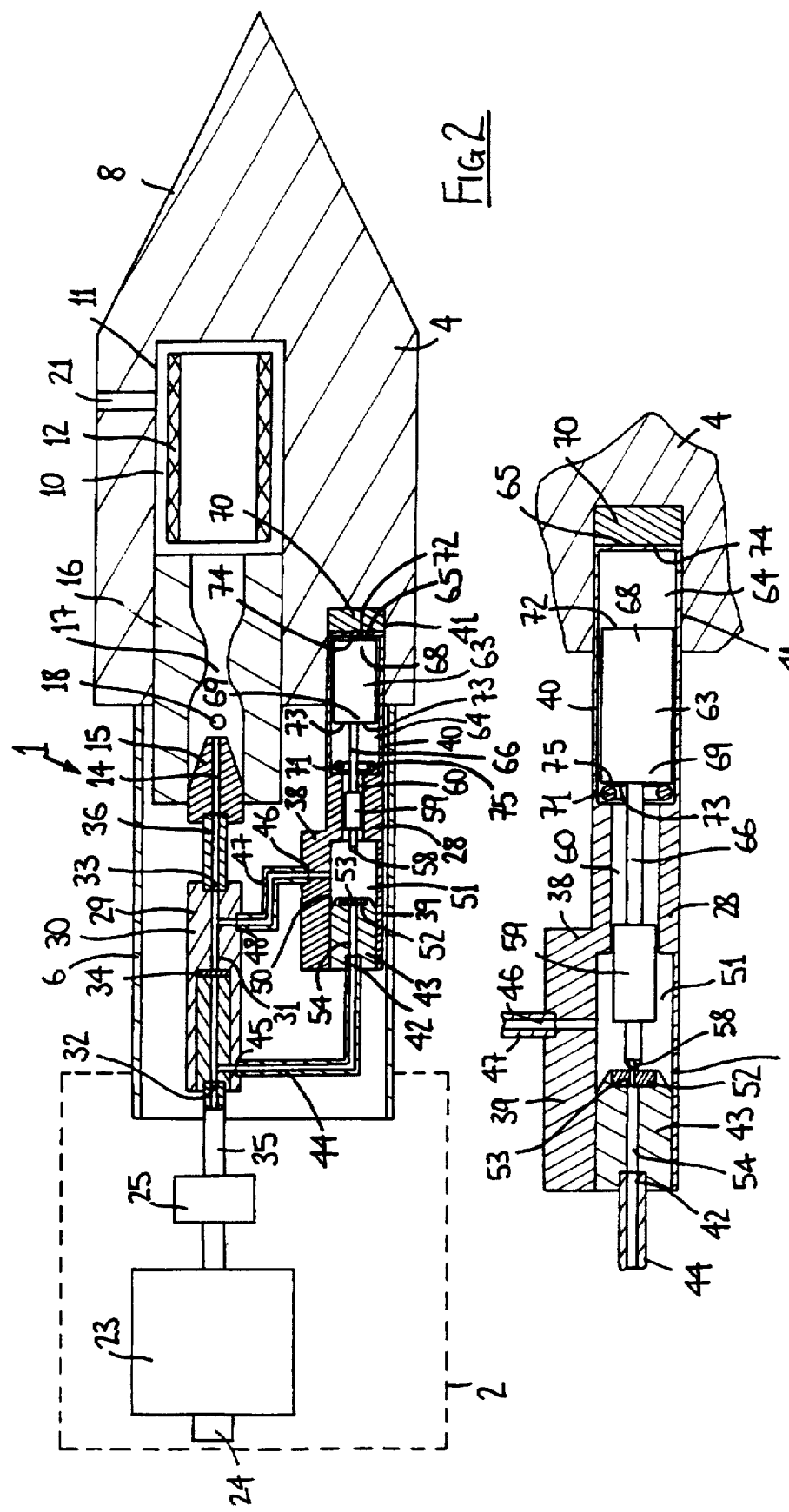

5,799,648

GAS POWERED HEATING DEVICE

BACKGROUND OF THE INVENTION

1. Field of the Invention

The present invention relates to a gas powered heating device, for example, a soldering iron, a glue gun, a clothes pressing iron or the like, and in particular, the invention relates to a gas powered heating device of the type comprising a main body member, a combustion chamber within which gas is converted to heat for heating the main body member, a jet means for delivering fuel gas to the combustion chamber, a fuel gas supply means for supplying fuel gas to the jet means, and a temperature responsive control means for controlling the supply of fuel gas to the jet means in response to the temperature of the main body member.

2. Description of the Prior Art

In general, gas powered heating devices are provided with a working body member, for example, in the case of a gas powered soldering iron or a desoldering iron, the working body member forms the soldering or desoldering tip portion of the soldering iron. In the case of a glue gun, the working body member in general, forms an elongated hollow housing having a bore extending therethrough, which forms a chamber for accommodating an elongated plug of hot-melt glue for heating and melting the glue for discharge through a nozzle from the chamber. A clothes pressing iron, is provided with a working body member in the form of a hot plate. The main body member, in general, is secured or formed integrally with the working body member of such devices for providing good heat conduction between the main body member and the working body member.

In many cases, it is desirable to control the temperature of the working body member. In general, temperature control is achieved by providing a temperature responsive control means which controls the supply of fuel gas to the jet means in response to a temperature sensor. The temperature responsive control means may be of the type which reduces the flow rate of fuel gas to the jet means on the temperature of the working body member exceeding the desired level; or alternatively, isolates the flow of fuel gas to the jet means on the temperature of the working body member exceeding the desired temperature. The temperature sensor, in general is located for monitoring an appropriate temperature, typically, the temperature of the main body member or the working body member. In general, temperature sensors used in conjunction with such temperature responsive control means comprise a bi-metal strip or other temperature expandable material so that on the temperature of the bi-metal strip or temperature expandable material exceeding a certain value, the temperature responsive control means is activated for either reducing or isolating the flow of fuel gas to the jet means. Such temperature responsive control means which incorporate temperature sensors which include a bi-metal strip or other temperature expandable material, suffer from a number of disadvantages. In particular, they tend to be relatively slow to react, and furthermore, they tend to cycle between a relatively wide range of temperatures around the desired temperature. For example, in general, the temperature of the main body member or working body member may have well exceeded the desired temperature before the temperature responsive control means reacts to reduce or isolate the flow of gas to the jet means. Furthermore, because of their relative slowness to react, the temperature of the main body member and/or working body member may have fallen well below the desired temperature before the temperature responsive control means reacts to return the flow of fuel gas to the jet means to normal. This, can present significant problems in the case of soldering and desoldering irons, and also in the case of glue guns. A further disadvantage of the use of a bi-metal strip and other temperature expandable materials is that they must be factory set for controlling the temperature at the desired value due to inconsistencies from bi-metal strip to bi-metal strip and inconsistencies in the temperature expandable material. This is undesirable.

There is therefore a need for a gas powered heating device which comprises a temperature responsive control means which is capable of maintaining the temperature of a main body member or a working body member of the heating device at a desired temperature within relatively narrower upper and lower temperature limits, and furthermore, there is a need for a gas powered heating device comprising a temperature responsive control means in which the temperature responsive control means reacts relatively rapidly to the temperature of the working body member of the heating device exceeding or falling below a desired temperature and which requires the minimum of factory setting.

It is an object of the invention to provide such a gas powered heating device.

SUMMARY OF THE INVENTION

According to the invention there is provided a gas powered heating device comprising a main body member, a combustion chamber within which gas is converted to heat for heating the main body member, a jet means for delivering fuel gas to the combustion chamber, a fuel gas supply means for supplying fuel gas to the jet means, and a temperature responsive control means for controlling the supply of fuel gas to the jet means in response to the temperature of the main body member for controlling the temperature of the main body member, wherein the temperature responsive control means comprises a valve means for controlling the supply of fuel gas to the jet means, a first member of thermomagnetic material, the magnetic characteristic of which is a function of the temperature of the first member, the first member being associated with the main body member so that the temperature of the first member is a function of the temperature of the main body member, and a magnet means located in magnetic relationship with the first member, one of the magnet means and the first member being movable relative to the other in response to a change in the magnetic characteristic of the first member, and the movable one of the magnet means and the first member being operably coupled to the valve means for operation thereof in response to a change in the magnetic characteristic of the first member.

Preferably, the first member is located on the main body member for minimizing the temperature drop between the main body member and the first member.

Ideally, the magnet means is movable relative to the first member.

In one aspect of the invention a second member of magnetic material is located in magnetic relationship with the magnet means, the first and second members being arranged relative to the magnet means so that the magnetic attraction between the second member and the magnet means is greater than the magnetic attraction between the first member and the magnet means for all positions of the magnet means while the temperature of the first member exceeds the temperature which is a function of a predetermined temperature of the main body member around which the temperature of the main body member is to be controlled for urging the magnet means towards the second member for controlling the valve means for controlling the flow of fuel gas to the jet means for in turn controlling the temperature of the main body member around the predetermined temperature.

Preferably, the first and second members are located relative to the magnet means so that the magnetic attraction between the second member and the magnet means is greater than the magnetic attraction between the first member and the magnet means as the temperature of the first member exceeds the temperature which is a function of a predetermined temperature of the main body member around which the temperature of the main body member is to be controlled.

Advantageously, the effective areas of attraction of the first member and the magnet means and the effective areas of attraction of the second member and the magnet means are selected so that the magnetic attraction between the second member and the magnet means is greater than the magnetic attraction between the first member and the magnet means as the temperature of the first member exceeds the temperature which is a function of a predetermined temperature of the main body member around which the temperature of the main body member is to be controlled.

For convenience the thermomagnetic material of the first member has a Curie point in a temperature range which is a function of the predetermined temperature around which the temperature of the main body member is to be controlled. Ideally, the Curie point of the thermomagnetic material of the first member is substantially similar to the predetermined temperature in embodiments of the invention where the first member is located in or on the main body member so that there is virtually no temperature drop between the main body member and the first member.

Preferably, the material of the second member is selected so that the magnetic characteristic of the second member is substantially constant over the entire working range of temperatures of the main body member, and ideally, the magnetic characteristic of the second member remains constant at temperatures above the predetermined temperature at which the main body member is being controlled, and preferably, well above the temperature at which the main body member is being controlled. Should it not be possible to obtain such a material, then it is preferable that the magnetic characteristic of the material of the second member should be substantially constant over a relatively wide range of temperatures around the predetermined temperature.

In a preferred embodiment of the invention the magnet means is located in a housing, the housing having an elongated magnet means accommodating bore defining a longitudinal axis, and the magnet means is slidable axially along the magnet means accommodating bore.

Preferably, the first and second members are located relative to the housing adjacent respective axially opposite ends of the magnet means accommodating bore for urging the magnet means along the magnet means accommodating bore for controlling the valve means.

Ideally, the magnet means comprises an elongated permanent magnet defining a longitudinal axis and defining magnetic north and south poles at respective axially opposite ends, the axis of the permanent magnet being parallel to the axis of the magnet means accommodating bore.

In one aspect of the invention the valve means and the magnet means are coupled so that the valve means delivers fuel gas at a minimum rate on the magnet means being urged towards the second member. In another aspect of the invention the valve means and the magnet means are coupled for closing the valve means on the magnet means being urged towards the second member.

Preferably, the valve means comprises a valve having a valve cavity and an inlet fuel gas delivery orifice for delivering fuel gas into the valve cavity, and a valving member being located in the valve cavity and being movable from an open position for allowing fuel gas through the orifice for delivery to the jet means, to a closed position engaging the orifice.

Ideally, a communicating means communicates the magnet means accommodating bore of the housing with the valve cavity for accommodating the fuel gas into the magnet means accommodating bore of the housing, the respective ends of the magnet means accommodating bore communicating with each other for maintaining the fuel gas pressure in the bore at respective axially opposite ends of the magnet means in equilibrium for minimising the force required for urging the valving member into the closed position. Preferably, the magnet means and the housing co-operate with each other for accommodating the flow of fuel gas longitudinally along the magnet means between the respective ends of the magnet means accommodating bore.

In an alternative embodiment of the invention the fuel gas is delivered to the jet means through the communicating means and the magnet means accommodating bore in the housing.

Preferably, the valving member is coupled to the magnet means by a coupling means extending from the magnet means accommodating bore of the housing. Advantageously, the coupling means is located in the communicating means.

In a preferred aspect of the invention a means is provided for maintaining a supply of fuel gas to the jet means at a relatively low flow rate just sufficient for maintaining combustion of the fuel gas in the combustion chamber while the temperature of the first member exceeds the temperature which is a function of the predetermined temperature of the main body member. Preferably, the means for maintaining the supply of fuel gas to the jet means at the relatively low flow rate comprises a by-pass means for by-passing the valve means for connecting the jet means directly to the fuel supply means.

Advantageously, a restrictor means is located in the by-pass means for supplying fuel gas to the jet means at the relatively low rate.

Alternatively, the means for maintaining the flow of fuel gas to the jet means at the relatively low rate is incorporated in the valve means.

In one aspect of the invention a gas catalytic combustion element is located in the combustion chamber for converting the fuel gas to heat therein. In such cases, it is preferable that the means for maintaining the flow of fuel gas to the jet means at the relatively low rate, maintains the flow of fuel gas at a rate which is just sufficient to maintain at least a portion of the catalytic element at or just above its ignition temperature. Ideally, the main body member is of a heat conductive material. Preferably, the first member is mounted in the main body member in heat conducting engagement therewith.

In one aspect of the invention the main body member is connected to a working body member with heat conducting engagement.

In one embodiment of the invention the working body member is a soldering tool tip.

In another embodiment of the invention the working body member is a glue accommodating barrel for heating and dispensing glue.

In another embodiment of the invention the working body member is a pressing plate of a clothes pressing iron.

In a still further embodiment of the invention the heating device is a hair curler.

In a still further embodiment of the invention the heating device is a hair curling tongs.

The advantages of the invention are many. Firstly, the temperature of the main body member can be maintained at the desired temperature within a relatively narrow range of temperatures on either side of the desired temperature. For example, in the case of a soldering iron where it is desirable that the main body member should operate at a temperature of the order of 500° C., in general, the temperature may be controlled around 500° C. plus or minus 15° C. Additionally, the response time to a change in temperature above or below the desired level is relatively rapid. Additionally, in general, factory setting of the temperature responsive control means is not required.

These advantages are achieved by virtue of the fact that the first member of the temperature responsive control means is of a thermomagnetic material. In general, thermomagnetic materials have a relatively well defined Curie point temperature. Below the Curie point temperature the thermomagnetic materials are magnetic and on reaching the Curie point, thermomagnetic materials begin to become non-magnetic. In general, such thermomagnetic materials become rapidly non-magnetic once the Curie point temperature has been exceeded. This, thus permits the temperature of the device to be controlled within relatively narrow limits by the temperature responsive control means, and also, provides a quick response time in operating the valve means of the temperature responsive control means in response to a change in temperature.

The provision of a second member of magnetic material of substantially constant magnetic characteristics, and in particular, of substantially constant magnetic characteristics within a relatively wide range of temperatures around the temperature at which the temperature of the device is to be controlled enables the temperature of the device to be controlled within narrower upper and lower temperature limits around the predetermined temperature. The provision of the communicating means between the valve chamber and the magnet means accommodating bore further enhances the response time of the temperature responsive control means by virtue of the fact that the force required for moving the magnet means, and in turn, the valving member from the open to the closed position is minimised. Accordingly, the magnet means is more readily responsive to the respective magnetic attractions between the magnet means and the first and second members.

The provision of a by-pass means is particularly advantageous in that it enables combustion to be maintained in the combustion chamber during periods when the temperature responsive control means isolates the fuel gas supply from the combustion chamber. This thus avoids the need for having to re-ignite the fuel gas in the combustion chamber each time the temperature responsive control means reinstates the supply of fuel gas to the combustion chamber. This advantage is also achieved when the valve means of the temperature responsive control means allows for the supply of fuel gas at a relatively low rate to the combustion chamber even when the valve means of the temperature responsive control means is in the closed position. By maintaining the flow of fuel gas to the combustion chamber at a relatively low rate even when the temperature responsive control means is in the closed position combustion is maintained in the combustion chamber. Where a gas catalytic combustion element is provided in the combustion chamber, at least a portion of the gas catalytic combustion element remains at or just above the ignition temperature of the combustion element thereby allowing full combustion in the combustion element to commence immediately the normal supply of fuel gas has been reinstated by the temperature responsive control means.

By virtue of the fact that the components of the temperature responsive control means can be assembled in predetermined positions relative to each other, and the thermomagnetic material can be selected with a relatively precise Curie point, the need for factory setting of the temperature responsive control means is eliminated.

The invention will be more clearly understood from the following description of some preferred embodiments thereof which are given by way of example only, with reference to the accompanying drawings, in which:

BRIEF DESCRIPTION OF THE DRAWINGS

FIG. 2 is a partly diagrammatic cross-sectional view of the soldering iron of FIG. 1.

FIG. 3 is a cross-sectional view of a detail of the soldering iron of FIG. 1 in a different position.

DESCRIPTION OF THE PREFERRED EMBODIMENTS

Figure 1:
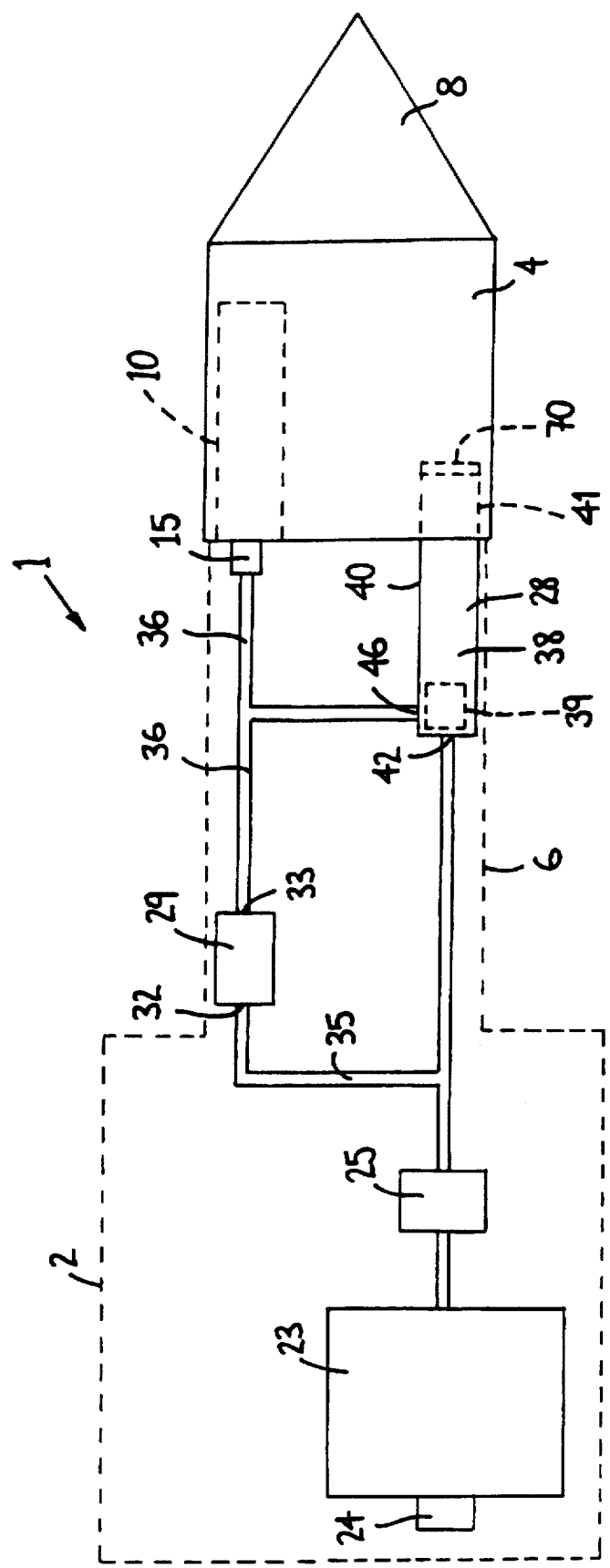
FIG. 1 is a block representation of a gas powered soldering iron according to the invention.

Referring to the drawings and initially to FIGS. 1 to 3 there is illustrated a gas powered heating device according to the invention, namely, a portable hand held gas powered soldering iron indicated generally by the reference numeral 1. The soldering iron 1 comprises an elongated handle housing 2 of plastics material, which is indicated diagrammatically by broken lines. The handle housing 2 may be of any suitable shape and construction, but typically, would be of hollow cylindrical construction, similar to that described in European Patent Specification No. EP-A-0,118,282. Such handle housings will be well known to those skilled in the art, and it is not intended to describe the handle housing in further detail. A main body member 4 of circular cross-section is of a heat conducting material, in this embodiment of the invention nickel plated brass and terminates in a working body member, namely, a soldering tip portion 8 for soldering. The main body member 4 is secured to the handle 2 by a connecting tube 6, which typically is of stainless steel material. The securing arrangement for securing the connecting tube 6 to the handle 2 and the main body member 4 are not illustrated, but will be readily apparent to those skilled in the art.

A combustion chamber 10 is formed by an elongated bore 11 of circular cross-section extending into the main body member 4 within which is located a gas catalytic combustion element 12 for converting fuel gas to heat for heating the main body member 4, and in turn, the tip portion 8. The combustion element 12 is of hollow cylindrical shape and may be formed of any suitable carrier and an appropriate catalyst, typically, a wire gauze coated with a precious metal catalyst, or a fibrous matt likewise coated with a precious metal catalyst. Alternatively, the gas catalytic combustion element may be provided by a porous ceramic carrier carrying a catalyst.

A jet means comprising a jet nozzle 15 of brass secured in a venturi housing 16 also of brass delivers fuel gas into a venturi bore 17 through the venturi housing 16 for subsequent delivery to the combustion chamber 10. The venturi housing 16 and the bore 17 are of circular cross-section, and the venturi housing is secured in part of the bore 11 forming the combustion chamber 10. A bore 14 extending through the jet nozzle 15 delivers fuel gas into the venturi bore 17. An air inlet port 18 extending through the venturi housing 16 accommodates air into the venturi bore 17 where the air and fuel gas are mixed. The fuel gas/air mixture is delivered into the combustion chamber 10 from the venturi bore 17 where it passes through and is combusted in the hollow cylindrical combustion element 12. An exhaust port 21 extending through the main body member 4 from the combustion chamber 10 exhausts burnt gases from the combustion chamber 10.

A fuel gas supply means comprising a liquid fuel gas reservoir 23 is located in the handle housing 2 for storing fuel gas. A filler valve 24 is provided in the handle housing 2 for refilling the reservoir 23. The reservoir 12 and filler valve 14 are illustrated in block representation only. A gas supply control mechanism 25 for controlling the supply of fuel gas from the reservoir is located in the handle housing 2. Since the control mechanism 25 does not form part of the invention the control mechanism 25 is illustrated in block representation only. However, such control mechanisms will be well known to those skilled in the art. Briefly, the control mechanism 25 comprises an evaporator valve (not shown) for converting the liquid fuel gas from the liquid phase to its gas phase, a flow control regulator (not shown) for controlling the flow rate of the fuel gas from the reservoir 23, and an on/off isolating valve (also not shown) for isolating fuel gas from the reservoir 23. The flow control regulator and the isolating valve are operable by appropriate hand or thumb operated wheels, levers, sliders and the like, none of which are shown but which, in general are mounted on the handle housing 2. The construction of such control mechanisms and operating wheels, levers and sliders, and also reservoirs will be well known to those skilled in the art, and may be of the type disclosed in European Patent Specification No. EP-A-0.118,282.

A temperature responsive control means for controlling the temperature of the main body member 4, and in turn, the soldering tip portion 8 at a desired predetermined temperature comprises a temperature responsive controller 28 for controlling the supply of fuel gas from the control mechanism 25 to the jet nozzle 15 in response to the temperature of the main body member 4. The temperature responsive controller 28 which is located in the connecting tube 6 is described in detail below.

A means for maintaining a supply of fuel gas to the jet nozzle 15 at a relatively low flow rate for maintaining at least a portion of the combustion element 12 at its ignition temperature even when the fuel gas supply is isolated by the temperature responsive controller 28 is provided by a by-pass means, namely, a by-pass element 29. The by-pass element 29 is located in the connecting tube 6 and comprises a by-pass housing 30 having a fuel supply bore 31 of circular cross-sectional area extending between an inlet end 32 and an outlet end 33. A restrictor means, namely, a restrictor membrane 34 extends transversely across and is located in the fuel supply bore 31 for restricting fuel gas to flow through the bore 31 at a relatively low flow rate. The restrictor membrane 34 is of a material which is permeable to fuel gas, but is of such permeability which significantly reduces the flow rate of fuel gas thereacross. Such a restrictor membrane will be well known to those skilled in the art. A fuel supply pipe 35 delivers fuel gas from the control mechanism 25 to the inlet 32 of the by-pass element 29, and a fuel supply pipe 36 delivers the fuel gas at the relatively low flow rate from the by-pass element 29 to the jet nozzle 15. Accordingly, even when the supply of fuel gas as will be described below is isolated by the temperature responsive controller 28 a supply of fuel gas at a relatively low flow rate is delivered to the combustion chamber for maintaining a portion of the catalytic combustion element at or just above its ignition temperature so that when the supply of fuel gas is restored to its normal flow rate by the temperature responsive controller 28 normal combustion in the catalytic element 12 is reinstated without the need for having to re-ignite the fuel gas in the combustion chamber 10.

The temperature responsive controller 28 comprises a housing 38 of non-magnetic material, namely, non-magnetic stainless steel, a portion of which forms a valve means, namely, a valve 39 for controlling the supply of fuel gas to the jet nozzle 15. A portion 40 of the housing 38 is of circular cross-sectional area and extends from the valve 39 and is secured in a bore 41 in the main body member 4. The bore 41 is of circular cross-sectional area and of diameter such that the portion 40 of the housing 38 is a tight fit in the bore 41 for securing and locating the temperature responsive controller 28 in the connecting tube 6. A bore 50 of circular cross-section extending into the housing 38 forming the valve 39 forms a valve cavity 51. A valve jet nozzle 43 of circular cross-section having a bore 54 extending therethrough is located in and secured in the bore 50 for delivering fuel gas into the valve cavity 51. Fuel gas is supplied to an inlet port 42 in the valve jet nozzle 43 through a fuel supply pipe 44 from an outlet port 45 in the by-pass element 29. Fuel gas is delivered from the valve cavity 51 through an outlet port 46 in the valve 39 and through a fuel supply pipe 47 to an inlet port 48 in the by-pass element 29. The outlet port 45 in the by-pass element 29 communicates with the fuel supply bore 31 upstream of the restrictor membrane 34, and the inlet port 48 to the by-pass element 29 communicates with the fuel supply bore 31 downstream of the restrictor membrane 34 so that the supply of fuel gas from the control mechanism 25 through the valve 39 to the jet nozzle 15 is unaffected by the restrictor membrane 34. An orifice plate 52 having an inlet fuel gas delivery orifice 53 extending therethrough is carried in the valve jet nozzle 43 for delivering fuel gas into the valve cavity 51 from the bore 54.

A valving member 58 which is carried on a carrier member 59, which is in turn, slidable longitudinally in a bore 60 in the portion 40 of the housing 58, co-operates with the orifice plate 52 for isolating the supply of fuel gas to the jet nozzle 15. The valving member 58 is of a resilient material, namely, a material sold under the trade name VITON by Du Pont and of hemi-spherical shape and engages the orifice plate 52 for sealing of the orifice 53. The carrier member 59 is slidable in the bore 60 from an open position illustrated in FIG. 2 with the valving member 58 spaced apart from the orifice plate 52 for permitting an unrestricted flow of fuel gas through the valve 39 to the jet nozzle 15, to a closed position illustrated in FIG. 3 engaging the orifice plate 52 for isolating the supply of fuel gas to the jet nozzle 15. The carrier member 59 is of stepped circular cross-sectional area, and the bore 60 is also of circular cross-sectional area and communicates with the valve cavity 51.

Movement of the carrier member 59, and in turn, the valving member 58 is controlled by a magnet means, namely, an elongated permanent magnet 63 of ferromagnetic material and of solid cylindrical construction of circular transverse cross-sectional area which is slidable axially longitudinally in an elongated magnet means accommodating bore 64 formed in the portion 40 of the housing 38. The bore 64 is of circular transverse cross-sectional area and communicates with the bore 60 which forms a communicating means between the valve cavity 51 and the bore 64. An end cap 65 sealably closes the bore 64. A coupling means comprising a spindle 66 extends axially between and rigidly connects the carrier member 59 to the permanent magnet 63, so that the carrier member 59 and the permanent magnet 63 move together.

The permanent magnet 63 defines a north magnetic pole at one axial end 68 and a south magnetic pole at the opposite axial end 69, and is slidable from end to end in the bore 64 under the influence of a first member 70 of thermomagnetic material and a second member 71 of magnetic material. Neither the first member 70 or the second member 71 are magnetised. The first member 70 is in the form of a circular disc and is located tightly within the bore 41 between the portion 40 of the housing 38 and the end of the bore 41 for ensuring good heat conduction between the main body member 4 and the first member 70. Thus, the temperature of the first member 70 is substantially similar to the temperature of the main body member 4. The second member 71 is located in the bore 64 at the opposite end to the first member 70 and is of ring shaped construction, and is axially aligned in the bore 64. The ferromagnetic material of the second member 71 is selected so that the magnetic characteristic of the second member 71 remains substantially constant over a relatively wide range of temperatures, and in particular, over a relatively wide range of temperatures around the predetermined temperature at which the temperature of the main body member 4 is to be controlled. The thermomagnetic material of the first member 70 is selected to have a Curie point at a temperature substantially similar to the predetermined temperature around which the main body member 4, and in turn, the soldering tip portion 8 are to be controlled. Thus, as the temperature of the main body member 4 and in turn the first member 70 reaches the Curie point temperature, the first member begins to become non-magnetic. The cross-sectional area of the permanent magnet 63 and the effective areas and locations of the first and second members 70 and 71, respectively, relative to the permanent magnet 63 are selected so that the magnetic attraction between the permanent magnet 63 and the second member 71 is greater than the magnetic attraction between the permanent magnet 63 and the first member 70 when the temperature of the first member 70 exceeds its Curie point and begins to become non-magnetic. Thus, on the temperature of the first member 70 exceeding its Curie point the attraction between the permanent magnet 63 and the second member 71 urges the permanent magnet 63 towards the second member 71, and in turn, urges the carrier member 59 and the valving member 58 into the closed position for isolating the fuel supply from the reservoir 23 to the jet nozzle 15 through the valve 39. Additionally, the effective areas and locations of the first and second members 70 and 71 relative to the permanent magnet 63 are also selected so that on the temperature of the first member 70 being below the Curie point the magnetic attraction between the permanent magnet 63 and the first member 70 is greater than the magnetic attraction between the permanent magnet 63 and the second member 71 and thus, the permanent magnet 63 is urged from the second member 71 towards the first member 70 for opening the valve 39. In this way the permanent magnet 63 slides in the bore 64 in response to the first member 70 changing between its magnetic and its non-magnetic states.

In this embodiment of the invention the effective cross-sectional area of the permanent magnet 63 which influences the magnetic attraction between the permanent magnet 63 and the first member 70 is the area of the transverse face 72 of the permanent magnet 63 at the north pole end 68 which faces the first member 70. The effective cross-sectional area of the permanent magnet 63 which influences the magnetic attraction between the permanent magnet 63 and the second member 71 is the area of the transverse face 73 at the south pole end 69 of the permanent magnet 63 which faces the second member 71. The effective area of the first member 70 which influences the magnetic attraction between the permanent magnetic 63 and the first member 70 is the face 74 of the first member 70 facing the permanent magnet 63, while the effective area of the second member 71 which influences the magnetic attraction between the permanent magnet 63 and the second member 71 is the area of the annular face 75 of the second member 71 facing the permanent magnet 63. The first member 70 is located outside the portion 40 of the housing 38, however, the end cap 65 is of thickness sufficient to provide the appropriate relative magnetic attractions between the permanent magnet 63 and the first and second members 70 and 71, respectively, as already described.

When selecting the relative effective areas of the faces 72, 73, 74 and 75 the magnetic characteristics of the first and second members 70 and 71 must be taken into account, as well as the strength of the permanent magnet 63. This will be appreciated by those skilled in the art.

The carrier member 59, the spindle 66 and the valve jet nozzle 43 are all of non-magnetic material so as not to effect the relative magnetic attraction between the permanent magnet 63 and the first and second members 70 and 71, respectively. The carrier member 59 and spindle 66 are of non-magnetic stainless steel material, and the valve jet nozzle 43 is of brass.

By locating the first member 70 on, and preferably, in the main body member 4 the response time of the temperature responsive controller 28 for controlling the temperature is considerably enhanced. Additionally, the upper and lower temperature around which the temperature of the soldering tip portion 8 is controlled is reduced, and furthermore, the Curie point of the thermomagnetic material of the first member 70 can be selected to be relatively close, and in most cases identical to the predetermined temperature at which the device 1 is to be controlled, since there will be virtually no temperature drop across the main body member 4.

In this embodiment of the invention it is desired to maintain the soldering tip portion 8 at a predetermined working temperature of approximately 500° C. The temperature drop from the soldering tip portion 8 to the end of the bore 41 in the main body member 4 is substantially 0° C. Accordingly, the thermomagnetic material of the first member 70 is selected to have a Curie point of approximately 500° C. On the other hand, should a temperature drop exist between the soldering tip portion 8 and the end of the bore 41 adjacent the first member 70 the thermomagnetic material of the first member 70 would be selected to have a Curie point which would be a function of the predetermined temperature to compensate for the temperature drop. In other words, the Curie point of the thermomagnetic material would be less than the desired predetermined temperature of the soldering tip portion 8 by the amount of the value of the temperature drop.

The transverse cross-sectional area of the carrier member 59 relative to the bore 60 is such as to accommodate the free flow of fuel gas into the bore 64 along the bore 60 between the carrier member 59 and the housing 40. The transverse cross-sectional area of the permanent magnet 63 relative to the bore 64 is also such as to accommodate the free flow of fuel gas from end to end along the bore 64 between the permanent magnet 63 and the housing 40. In this way, the fuel gas pressure is equalised along the bores 60 and 64. This thus minimises the urging force which is required for urging the valving member 58 into engagement with the orifice plate 52 for closing the orifice 53. In other words, since there is no pressure differential across the permanent magnet 63 and the carrier member 59, no additional force is required for urging the permanent magnet 63 and the carrier member 59 into the closed position, which would otherwise be required in the event of a pressure differential developing across either or both the permanent magnet 63 and the carrier member 59.

An ignition means for initially bringing a portion of the catalytic element 12 to its ignition temperature comprises a hot wire ignition element (not shown) embedded in the combustion element 12. The hot wire ignition element is battery powered from a battery (not shown) located in the handle housing 2. A switch (not shown) for initially delivering power to the hot wire ignition element is incorporated in the control mechanism 25 for initially delivering electrical power to the hot wire ignition element from the battery until the combustion element 12 commences to combust the gas. Such hot wire ignition heating elements and their control will be well known to those skilled in the art.

In use, the control mechanism 25 is operated to deliver fuel gas to the jet nozzle 15. Initially, since the temperature of the first member 70 is below its Curie point the permanent magnet 63 is at the end of the bore 64 adjacent the first member 70 thus holding the valve 39 open. Fuel gas is delivered through the by-pass element 29 and the valve 39 to the jet nozzle 15. The fuel gas is delivered from the jet nozzle 15 into the venturi bore 17 of the venturi housing 16 where it is mixed with air drawn in through the air inlet port 18. The fuel gas/air mixture is delivered into the combustion chamber 10. Initial operation of the control mechanism 25 operates the hot wire ignition element for heating a portion of the combustion element 12 to its ignition temperature, at which stage the catalytic element 12 commences to combust the fuel gas/air mixture and convert the fuel gas/air mixture to heat. Combustion rapidly spreads throughout the catalytic element 12. On the temperature of the main body member 4 adjacent the end of the bore 41 exceeding the Curie point temperature of the first member 70, and in turn, on the first member 70 exceeding its Curie point temperature, the first member 70 begins to become non-magnetic, and the permanent magnet 63 is urged into engagement with the second member 71 thereby closing the valve 39. The permanent magnet 63 remains in this position until the temperature of the first member 70 drops just below its Curie point. While the valve 39 is closed, fuel gas continues to flow through the by-pass element 29, thereby maintaining at least a portion of the combustion element 12 at or just above its ignition temperature. On the main body member 4 cooling to the Curie point temperature, and in turn, the first member 70 cooling to the Curie point temperature, the first member 70 becomes magnetic again and the permanent magnetic 63 is disengaged from the second member 71 and is urged to the end of the bore 64 adjacent the first member 70, thereby opening the valve 39 for delivering fuel gas to the jet nozzle 15. The permanent magnetic 63 remains in this position until the temperature of the first member 70 again exceeds the Curie point temperature and becomes non-magnetic. And so the temperature of the main body member 4 is maintained at the desired temperature of approximately 500° C.

Figure 4:
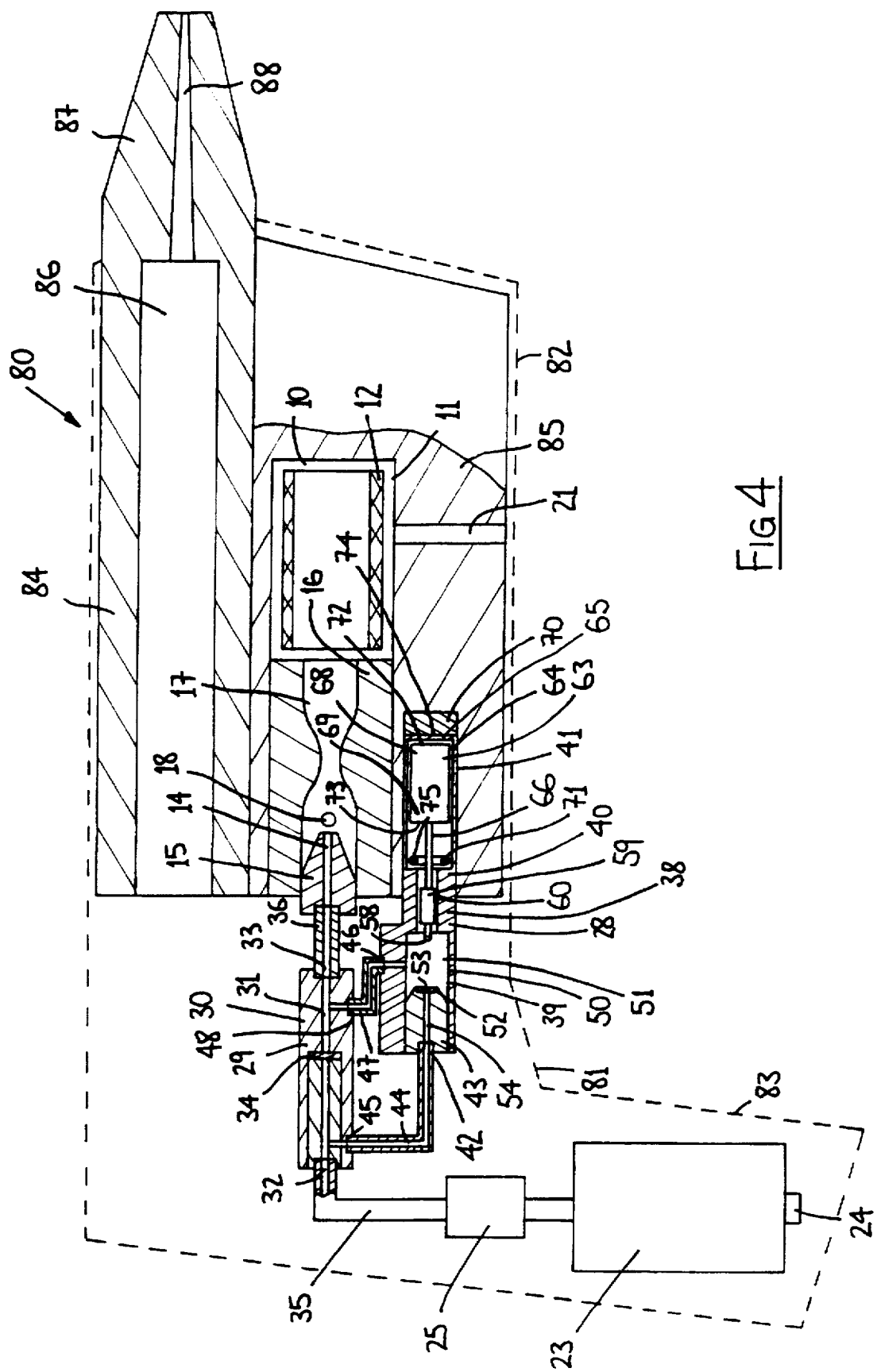
FIG. 4 is a partly diagrammatic cross-sectional view of a glue gun according to another embodiment of the invention.

Referring now to FIG. 4 there is illustrated a gas powered heating device according to another embodiment of the invention, in this case, a portable hand held glue gun indicated generally by the reference numeral 80. The glue gun 80 comprises a housing 81 of plastics material which is illustrated in broken lines, and which is of gun shape having a main portion 82 and a downwardly extending handle portion 83. The general shape and construction of such glue guns will be known to those skilled in the art. The glue gun 80 is particularly suitable for melting and dispensing hot-melt glues. A working body member providing by a glue accommodating barrel 84 is located in the main portion 82 of the housing 81, and is secured to a main body member 85 with heat conducting engagement for conducting heat from the main body member 85 to the glue accommodating barrel 84. The main body member 85 and the glue accommodating barrel 84 are both of heat conductive material, namely, zinc diecasting or aluminium material. An elongated bore of circular cross-section extending through the glue accommodating barrel 84 forms a chamber 86 for accommodating a stick of hot-melt glue. A dispensing nozzle 87 having an outlet bore 88 extending from the glue accommodating barrel 84 dispenses hot-melted glue. A suitable hand operated dispensing mechanism (not shown) is provided for urging the glue stick along the chamber 86, and for in turn urging the melted glue through the dispensing nozzle 87. Such dispensing mechanisms will be well known to those skilled in the art.

A temperature responsive controller 28 identical to the temperature responsive controller 28 of the soldering iron 1 controls the temperature of the main body member 85, and in turn, the glue accommodating barrel 84. The construction and operation of the main body member 85 and the temperature controller 28 is substantially similar to the main body member 4 and similar components are identified by the same reference numerals. Additionally, the gas supply arrangement for supplying fuel gas to the combustion chamber 10 in the main body member 85 is likewise similar to the fuel supply arrangement of the soldering iron 1. A fuel gas reservoir 23 is located in the handle portion 83 of the housing 81 which delivers gas through a control mechanism 25 to a by-pass element 29 and the temperature responsive controller 28. Operating buttons and levers for operating the control mechanism 25 in similar fashion as the control mechanism 25 is operated in the soldering iron 1 are also provided but are not shown. The operation of the by-pass element 29 and the temperature responsive controller 28 for controlling the temperature of the main body member 86 and in turn the glue accommodating barrel 84 is identical to that of the by-pass element 29 and the temperature responsive controller 28 already described with reference to the soldering iron 1. The thermomagnetic material of the first member 70 in this embodiment of the invention is selected to have a Curie point allowing for any temperature drop between the glue accommodating barrel 84 and the first member 70 so that the glue accommodating barrel 84 is controlled around the desired temperature at which the hot-melt glue melts.

Operation of the glue gun 80 is substantially similar to operation of the soldering iron 1, and on the temperature of the glue accommodating barrel 84 raising to the desired predetermined temperature the glue in the chamber 86 commences to melt, and by applying pressure on the dispensing mechanism, melted glue is dispensed through the outlet bore 88 in the nozzle 87.

The temperature of the main body member 85, and in turn, the temperature of the glue accommodating barrel 84 is controlled by the temperature responsive controller 28 at the predetermined temperature in similar fashion as the temperature of the main body member 4 and the soldering tip portion 8 of the soldering iron 1 is controlled.

Figure 5:
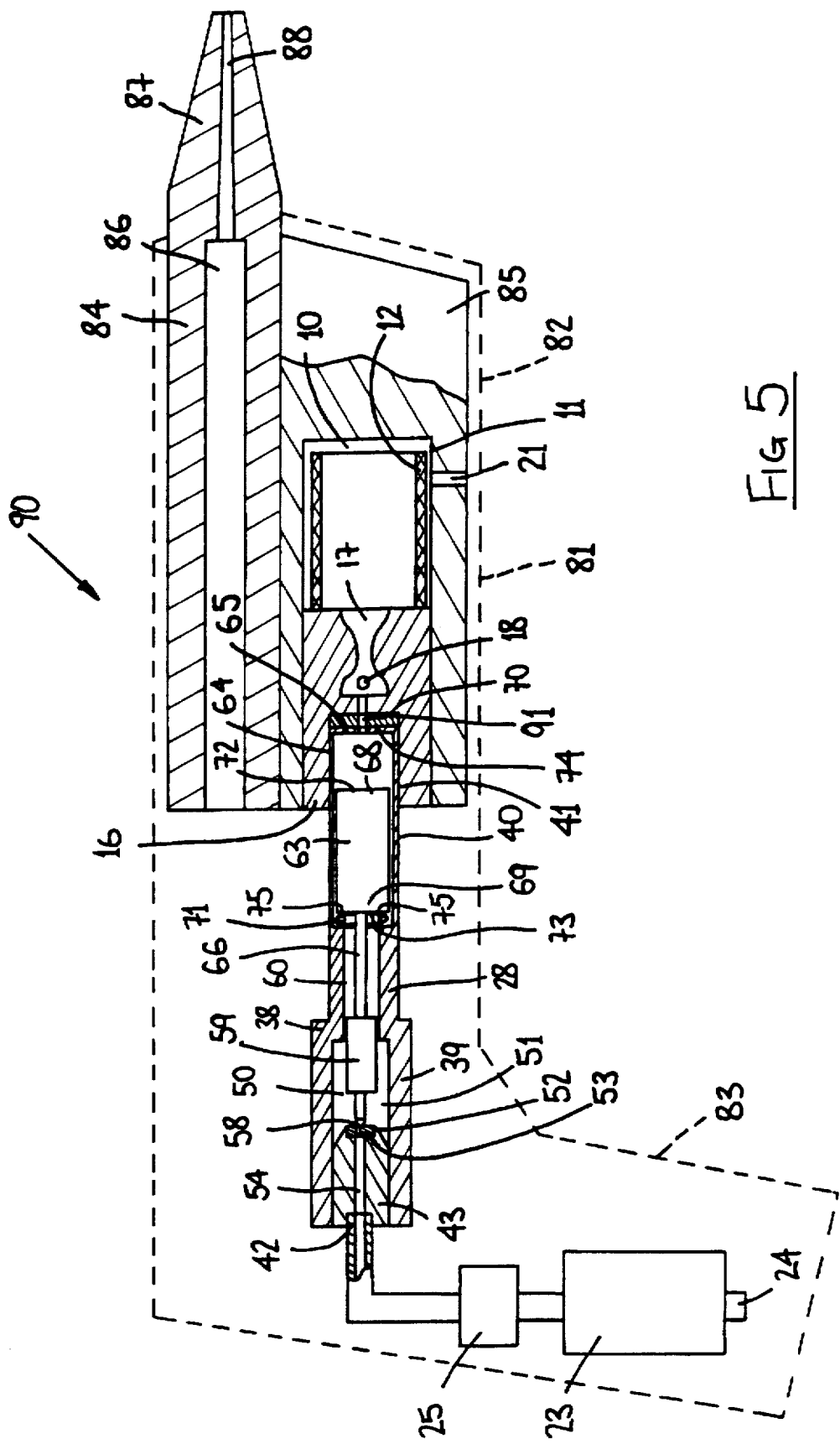
FIG. 5 is a view similar to FIG. 4 of a glue gun according to a further embodiment of the invention.

Referring now to FIG. 5 there is illustrated a glue gun indicated generally by the reference numeral 90 according to another embodiment of the invention. The glue gun 90 is substantially similar to the glue gun 80 and similar components are identified by the same reference numerals. The main difference between the glue gun 90 and the glue gun 80 is that the by-pass element 29 has been dispensed with. Fuel gas from the control mechanism 25 is delivered directly to the valve 39 of the temperature responsive controller 28, and fuel gas from the valve cavity 51 is delivered into the venturi bore 17 of the venturi housing 16 through the bores 60 and 64 which extend through the housing 38 of the temperature responsive controller 28. A bore 91 of relatively small diameter extends through the end cap 65, the first member 70 and portion of the venturi housing 16 for delivering fuel gas from the bore 64 into the venturi bore 17. Instead of providing a by-pass element, in this embodiment of the invention the orifice plate 52 and the valving member 58 co-operate when the valving member is in the closed position as illustrated in FIG. 5 for allowing fuel gas to flow through the orifice 53 at a relatively low rate for maintaining at least a portion of the combustion element 12 at or just above its ignition temperature. In other words, the valving member 58 and orifice plate 52 are so arranged that the valving member 58 never completely closes the orifice 53.

Operation of the glue gun 90 is substantially similar to that of the glue gun 80 described with reference to FIG. 4, with the exception that the gas is delivered directly from the valve cavity 51 into the venturi bore 17 through the bores 60 and 64 of the housing 38.

The temperature of the main body member 85 and in turn the temperature of the glue accommodating barrel 84 is controlled at the predetermined temperature by the temperature controller 28 in similar fashion as the main body member 4 and the soldering tip portion 8 of the soldering iron 1 are controlled.

While the gas powered heating device has been described as being a soldering iron and a glue gun, the gas powered heating device may be any other heating device, for example, a clothes pressing iron, a hair curler, a hair curling tongs or any other device. In the case of a clothes pressing iron, it is envisaged that the body member would be securely connected to a hot plate of the iron for transferring heat by conduction to the hot plate. In the case of a hair curler, or a hair curling tongs, it is envisaged that the temperature sensitive magnetic material would be located in or adjacent the portion of the device in contact with the hair, for example, a tubular barrel about which the hair would be wound, and within which the main body member, combustion chamber and jet nozzle would be located.

While the main body member and glue accommodating barrel of the glue guns have been described as being provided by separate members secured together, the main body member and glue accommodating body members of the respective glue guns could be provided as one single integral unit.

While the magnet means has been described as being a permanent magnet, any other suitable magnet or magnet means may be used.

While the soldering iron has been described as comprising a by-pass means separate to the temperature responsive controller, in certain cases, it is envisaged that the by-pass means may be incorporated in the valve means as in the case of the glue gun of FIG. 5.

While the gas powered heating device has been described as comprising a gas catalytic combustion element for converting the gas to heat, the gas could be burnt in a flame in the combustion chamber or in any other suitable combustion area.

It will be appreciated that the thermomagnetic material of the first member will be selected with a Curie point temperature suitable for controlling the temperature of the device around the desired temperature. For example, the Curie point temperature of the first member for controlling the temperature of a hair curler or a hair curling tongs, may be as low as 30° C., or even lower. While in the case of a soldering iron, the Curie point temperature of the first member could be as high as 500° C., or even higher. In the case of a glue gun, the Curie point temperature of the first member will be selected so that the temperature of the glue accommodating barrel within which the glue is melted and dispensed will be controlled at a temperature around the melting point temperature of the glue or at a temperature just above the melting point of the glue. For example, in certain cases, glues of melting point temperature as low as 50° C., as in the case of some dental glues may be used, and in which case, the Curie point temperature of the first member would be approximately 50° C. Needless to say, where glues of higher melting point temperatures are to be used, a first member of the appropriate higher Curie point temperature will be provided.

While the heating devices described with reference to the drawings have been described as being gas powered using a gas catalytic combustion element, it will be appreciated that the gas may be burnt with a flame in the combustion chamber or in any other suitable combustion area, in which case, the temperature responsive controller and the by-pass element would operate in a substantially similar fashion to that described and when the supply of fuel gas is isolated by the temperature responsive controller, fuel gas would be delivered to the jet nozzle at the relatively low flow rate through the by-pass element for maintaining the gas burning with a flame at a relatively low level so that on the temperature responsive controller reinstating the supply of fuel gas to the jet nozzle the gas will continue to burn but with a significantly more vigorous flame.

We claim:

1. A gas powered heating device comprising:

a main body member (4,85), a combustion chamber (10) adjacent the main body member (4,85) within which gas is converted to heat for heating the main body member (4,85), a jet means (15) for delivering fuel gas to the combustion chamber (10), a fuel gas supply means (23,25) connected to the jet means (15) for supplying fuel gas to the jet means (15), and a temperature responsive control means (28) for controlling the temperature of the main body member (4,85) around a predetermined temperature, the temperature responsive control means comprising:

a valve means (39) for controlling the supply of fuel gas from the fuel gas supply means (23,25) to the jet means (15), a first member (70) of thermomagnetic material, the magnetic characteristic of which is a function of the temperature of the first member (70), the first member (70) being associated with the main body member (4,85) so that the temperature of the first member (70) is a function of the temperature of the main body member (4,85), a second member (71) of magnetic material located spaced apart from the first member (70), and a magnet means (63) operably associated with the valve means (39) for operation thereof, the magnet means (63) being moveable between the first member (70) and the second member (71) and being located in magnetic relationship with the first member (70) and the second member (71) so that the magnetic attraction between the second member (71) and the magnet means (63) is greater than the magnetic attraction between the first member (70) and the magnet means (63) for all positions of the magnet means (63) while the temperature of the first member (70) exceeds a temperature which is a function of the predetermined temperature for urging the magnet means (63) towards the second member (71) for operating the valve means (39) for controlling the flow of fuel gas to the jet means (15) for in turn controlling the temperature of the main body member (4,85) around the predetermined temperature.

2. A heating device as claimed in claim 1 characterised in that the first member (70) is located on the main body member (4,85).

3. A heating device as claimed in claim 1 characterised in that the first and second members (70,71) are located relative to the magnet means (63) so that the magnetic attraction between the second member (71) and the magnet means (63) is greater than the magnetic attraction between the first member (70) and the magnet means (63) as the temperature of the first member (70) exceeds the temperature which is a function of a predetermined temperature of the main body member (4,85) around which the temperature of the main body member (4,85) is to be controlled.

4. A heating device as claimed in claim 1 characterised in that the effective areas of attraction of the first member (70) and the magnet means (63) and the effective areas of attraction of the second member (71) and the magnet means (63) are selected so that the magnetic attraction between the second member (71) and the magnet means (63) is greater than the magnetic attraction between the first member (70) and the magnet means (63) as the temperature of the first member (70) exceeds the temperature which is a function of a predetermined temperature of the main body member (4,85) around which the temperature of the main body member (4,85) is to be controlled.

5. A heating device as claimed in claim 1 characterised in that the thermomagnetic material of the first member (70) has a Curie point in a temperature range which is a function of the predetermined temperature around which the temperature of the main body member (4,85) is to be controlled.

6. A heating device as claimed in claim 1 characterised in that the Curie point of the thermomagnetic material of the first member (70) is substantially similar to the predetermined temperature.

7. A gas powered heating device as claimed in claim 1 characterised in that the material of the second member (71) is selected so that the magnetic characteristic of the second member (71) is substantially constant over a relatively wide range of temperatures around the predetermined temperature.

8. A heating device as claimed in claim 1 characterised in that the magnet means (63) is located in a housing (38,40), the housing having an elongated magnet means accommodating bore (64) defining a longitudinal axis, and the magnet means (63) is slidable axially along the magnet means accommodating bore (64), and the first and second members (70,71) are located relative to the housing (38,40) adjacent respective axially opposite ends of the magnet means accommodating bore for urging the magnet means (63) along the magnet means accommodating bore (64) for controlling the valve means (39).

9. A heating device as claimed in claim 8 characterised in that the magnet means (63) comprises an elongated permanent magnet (63) defining a longitudinal axis and defining magnetic north and south poles (68,69) at respective axially opposite ends, the axis of the permanent magnet (63) being parallel to the axis of the magnet means accommodating bore (64).

10. A heating device as claimed in claim 1 characterised in that the valve means (39) and the magnet means (63) are coupled so that the valve means (39) delivers fuel gas at a minimum rate on the magnet means (63) being urged towards the second member (71).

11. A heating device as claimed in claim 1 characterised in that the valve means (39) and the magnet means (63) are coupled for closing the valve means (39) on the magnet means (63) being urged towards the second member (71).

12. A heating device as claimed in claim 1 characterised in that the valve means (39) comprises a valve (39) having a valve cavity (51) and an inlet fuel gas delivery orifice (53) for delivering fuel gas into the valve cavity (51), and a valving member (58) being located in the valve cavity (51) and being movable from an open position for allowing fuel gas through the orifice (53) for delivery to the jet means (15), to a closed position engaging the orifice (53).

13. A heating device as claimed in claim 12 characterised in that a communicating means (60) communicates the magnet means accommodating bore (64) of the housing (38,40) with the valve cavity (51) for accommodating the fuel gas into the magnet means accommodating bore (64) of the housing (38,40), the respective ends of the magnet means accommodating bore (60) communicating with each other for maintaining the fuel gas pressure in the bore (64) at respective axially opposite ends of the magnet means (63) in equilibrium for minimising the force required for urging the valving member (58) into the closed position.

14. A heating device as claimed in claim 13 characterised in that the magnet means (63) and the housing (38, 40) co-operate with each other for accommodating the flow of fuel gas longitudinally along the magnet means (63) between the respective ends of the magnet means accommodating bore (64).

15. A heating device as claimed in claim 13 characterised in that the fuel gas is delivered to the jet means (15) through the communicating means (60) and the magnet means accommodating bore (64) in the housing (38,40).

16. A heating device as claimed in claim 13 characterised in that the valving member (58) is coupled to the magnet means (63) by a coupling means (66) extending from the magnet means accommodating bore (64) of the housing (38, 40).

17. A heating device as claimed in claim 13 characterised in that the coupling means (66) is located in the communicating means (60).

18. A heating device as claimed in claim 1 characterised in that a means (29) is provided for maintaining a supply of fuel gas to the jet means (15) at a relatively low flow rate just sufficient for maintaining combustion of the fuel gas in the combustion chamber (10) while the temperature of the first member (70) exceeds the temperature which is a function of the predetermined temperature of the main body member (4.85).

19. A heating device as claimed in claim 18 characterised in that the means (29) for maintaining the supply of fuel gas to the jet means (15) at the relatively low flow rate comprises a by-pass means (29) for by-passing the valve means (39) for connecting the jet means (15) directly to the fuel supply means (23.25).

20. A heating device as claimed in claim 19 characterised in that a restrictor means (34) is located in the by-pass means (29) for supplying fuel gas to the jet means (15) at the relatively low rate.

21. A heating device as claimed in claim 18 characterised in that the means (29) for maintaining the flow of fuel gas to the jet means at the relatively low rate is incorporated in the valve means (39).

22. A heating device as claimed in claim 1 characterised in that a gas catalytic combustion element (12) is located in the combustion chamber (10) for converting the fuel gas to heat therein.

23. A heating device as claimed in claim 23 characterised in that the means (29) for maintaining the flow of fuel gas to the jet means (15) at the relatively low rate, maintains the flow of fuel gas at a rate which is just sufficient to maintain at least a portion of the catalytic element (12) at or just above its ignition temperature.

24. A heating device as claimed in claim 1, characterised in that the main body member (4.85) is of a heat conductive material, and the first member (70) is mounted in the main body member (4.85) in heat conducting engagement therewith.

25. A heating device as claimed in claim 1 characterised in that the main body member (4.85) is connected to a working body member (8.84) with heat conducting engagement.

26. A heating device as claimed in claim 25 characterised in that the working body member (8) is a soldering tip (8).

27. A heating device as claimed in claim 25 characterised in that working body member (84) is a glue accommodating barrel (84) for heating and dispensing glue.

\* \* \* \* \*